Oct. 2, 1945.　　　H. S. PETERSON　　　2,385,881
VIBRATION-REDUCING CONTROL UNIT
Filed July 4, 1944　　　2 Sheets-Sheet 1
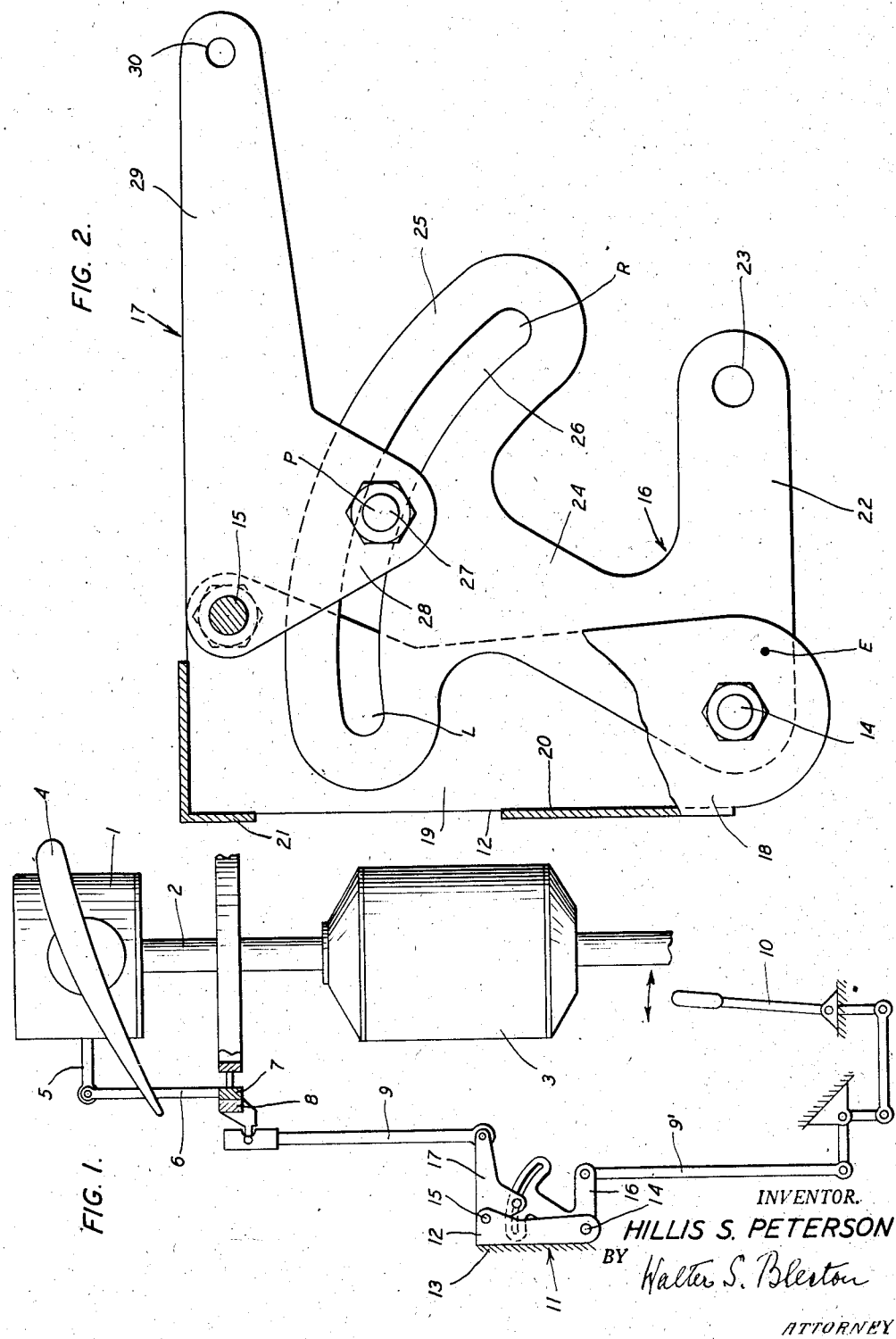
INVENTOR.
HILLIS S. PETERSON
BY
ATTORNEY

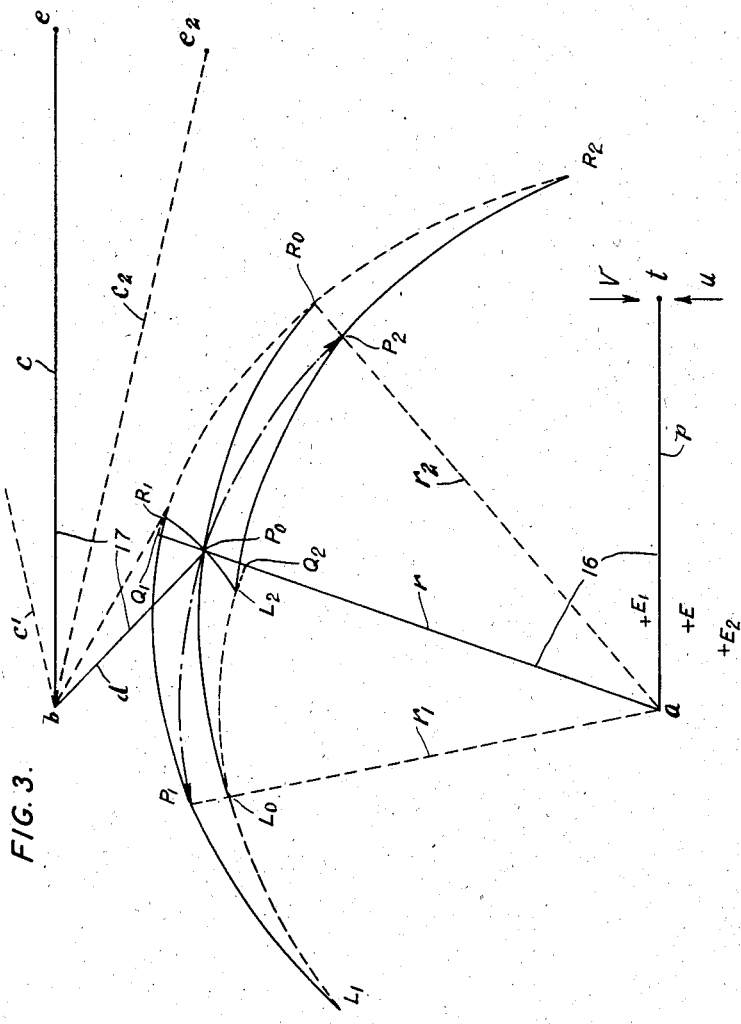
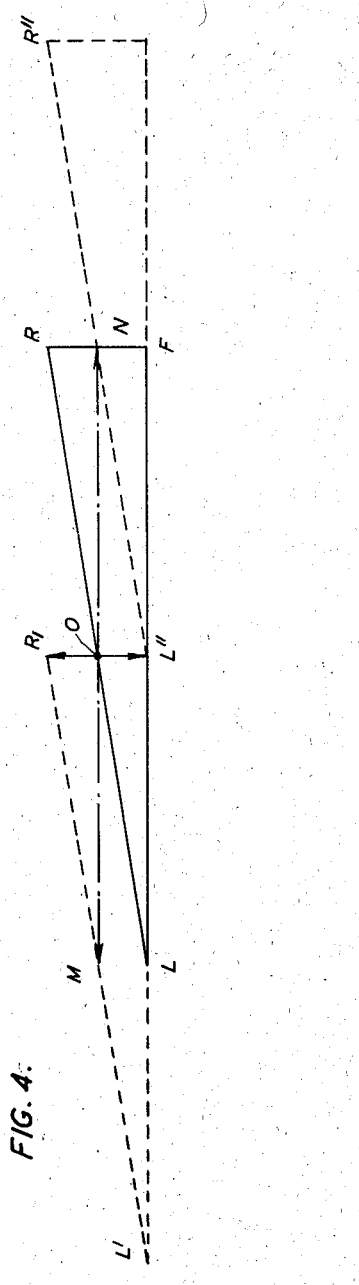
FIG. 3.
FIG. 4.
INVENTOR.
HILLIS S. PETERSON
ATTORNEY

Patented Oct. 2, 1945

2,385,881

UNITED STATES PATENT OFFICE 2,385,881

VIBRATION-REDUCING CONTROL UNIT

Hillis S. Peterson, New Orleans, La., assignor to Higgins Industries, Incorporated, New Orleans, La., a corporation of Louisiana Application July 4, 1944, Serial No. 543,449

8 Claims. (Cl. 74—497)

The invention relates to a control unit for use in connection with control systems where a controlled element is subject to vibrations which are apt to be transmitted to a control element actuated by an operator. Such control systems are conventional in many kinds of vehicles and an example of the applicability of the invention is in the control system for the feathering of the blades of the rotor of a rotary wing aircraft. In craft of the mentioned type, a control element, e. g., a wheel or stick, is permanently in the hand of the pilot, who actuates it to set or adjust the position of the controlled element, e. g. a swash plate in connection with a helicopter rotor. An arrangement of this kind is disclosed for instance in the application for U. S. Patent Serial No. 444,799, filed by Enea Bossi on May 28, 1942. Usually, there is a neutral position from which the controlled element is deflected by the pilot in order to bring about certain reactions on the craft, be it to alter the position of the craft in space, be it to counteract external forces. In many control systems of that type, it is desirable that there is a certain tendency of the controlled element to return automatically to neutral position and, in so doing, to take along the control wheel or stick connected to it by suitable members such as rods, cables and the like. In general, however, the conventional connections between the control wheel or stick and the controlled element transmit not only such desirable reactions, but also very undesirable vibrations originating with the controlled element, owing to the effect of external forces. Such vibrations transmitted to the control stick or wheel can strain the pilot very severely and exhaust him in an unduly short time.

The invention aims, therefore, to provide a control unit of simple design and requiring little space but effective to prevent or at least to reduce to a minimum the transmission of vibrations, and still to permit the controlled element to react on the control wheel or stick in a prevailing tendency to return to neutral position.

Another object of the invention is the provision, for the indicated purpose, of a device which can be inserted, without material changes of existing structure and arrangement, into a great variety of conventional control systems, and which does not materially increase the friction occurring therein.

The invention mainly consists of a cam mechanism equivalent in effect to an inclined plane of a predetermined slope in relation to a base normal with respect to a force acting on the plane, whereinto the slope is selected from between an upper and a lower limit, the upper limit being defined as the steepest slope at which self-locking of the members of the cam mechanism owing to friction can occur with respect to forces acting from the side of the controlled element, and the lower limit being the smallest slope at which the self-locking feature can be overcome by vibrations.

Further objects and details of the invention will be apparent from the description given hereinafter and the accompanying drawings illustrating an embodiment thereof by way of example.

In the drawings,

Fig. 1 is a diagrammatical illustration of an embodiment of the invention as applied to the control system of a helicopter;

Fig. 2 is a side elevation of the cam mechanism shown in Fig. 1, on a larger scale;

Fig. 3 is a diagram illustrating the cam movement; and

Fig. 4 is a diagram of an equivalent inclined plane.

As stated hereinbefore, a rotary wing aircraft is a type of a vehicle to which my invention may be applied with particular advantage. Accordingly, Fig. 1 illustrates a control system for the rotor of a helicopter. The rotor comprises a hub 1 with shaft 2 rotated by a motor (not shown) through the intermediary of a transmission 3. Blades 4 are so pivoted in the hub 2, that they can be oscillated about their longitudinal axis by an arm 5 projecting from the hub. Arm 5 is connected by a rod 6 to the rotating part 7 of a swash plate mechanism, which also comprises a non-rotating part 8 connected by a train of elements such as rods 9 and 9' to a control stick 10.

According to the invention, a cam mechanism 11 is inserted in the train of the mentioned elements or rods 9, 9'. This mechanism comprises a stationary part 12 secured to the fuselage 13 of the craft and containing pivots 14 and 15 for two bell crank levers 16 and 17 respectively. In general, two sets of elements such as rods 9, 9' are provided and attached to the swash plate at points spaced 90° from each other in order to render the swash plate tiltable in any desired direction with respect to the rotor axis. If this is the case, a cam mechanism 11 should be inserted in each of the train of elements at a suitable place between the controlling member, such as the control stick 10 and the controlled element, i. e. the swash plate part 8.

As stated hereinbefore, the cam mechanism 11 has the purpose of preventing the transmission of vibrations from the swash plate to the control stick and still to permit a simultaneously prevailing steady force acting from the side of the swash plate to pass through to the control stick. In addition, the arrangement may be such, as it is desirable in many cases, that the steady force passing the cam mechanism becomes reduced in its strength. Such function of the cam mechanism is to be accomplished without materially interfering with the transmission of controlling movements from the side of the stick 10 to the swash plate 7, 8. The principle according to which this problem is solved by my invention will be described with reference to Fig. 4. If a weighted body bears at O on an inclined plane LR of a slope RF:LF, friction will prevent it from sliding downward, provided the slope does not exceed a value X, depending on certain qualities of the materials of the body and the plane. If, however, the body vibrates on the plane, the minimum slope value at which sliding occurs will be appreciably reduced e. g. to Y. Similarly, if the body at O is so guided that it can move only in a vertical direction R′L″, whereas the inclined plane is shiftable in a horizontal direction LF, and considering only the friction between the plane and the body, the plane will be shifted towards the right-hand side under the pressure of the body, when the slope value is greater than Y or X, depending on whether or not the body vibrates. On the other hand, the body at O can be raised or lowered by shifting the plane to the left or right, i. e. in the positions L′R′ or L″R″ respectively.

According to this mechanical principle, the invention provides a cam mechanism equivalent in action to an inclined plane of a slope selected between the mentioned values X and Y, in combination with means whereby a follower movable substantially transverse to the movement of the cam surface will be held in close proximity thereto, but free from constraint so as to vibrate with small amplitudes. Whether a slope value closer to the value X or the value Y is to be selected will depend on the desired sensitivity of the mechanism. Furthermore, the slope may vary throughout the arc of the active cam surface as it will be described hereinafter in connection with the illustrated embodiment. The values X and Y can be found by experiment or taken from available tables stating the friction coefficients for the different materials.

Various structures of mechanisms complying with the aforestated requirements are conceivable. The form illustrated in Figs. 1 and 2 is preferred on account of its great simplicity and the possibility of readily inserting it in existing control systems of a great variety of craft. The stationary part 12 mentioned in connection with the description of Fig. 1 is shown in Fig. 2 as substantially channel-shaped, with flanges 18 and 19 connected by web portions 20 and 21 which may be used to secure the part 12 to a stationary part such as the fuselage of the craft. Pivot bolts 14 and 15 are secured to the flanges 18 and 19 and the bell crank levers 16 and 17 are turnable on these bolts respectively. Lever 16 has one arm 22, the free end of which has a hole 23 to which a rod such as 9′ of Fig. 1 may be linked. The other arm 24 forms a segment 25 with a cam-slot 26. The lever 16 is shown in its middle or neutral position from which it may be turned to the left and the right approximately equal angles. In this position, a pin 27 constituting the follower is in engagement with the slot at a point P approximately halfways between the slot ends L and R. The pin 27 is secured to a portion 28 constituting one arm of the bell-crank lever 17. This arrangement defines the path of the pin as an arc of a circle about the pivot 15 and transverse in relation to the path of the slot 26. The ideal position of the pivot 15 would be on a line through point P at right angles to the line connecting point P with the center of the pivot 14. However, it will be explained hereinafter that the desired result may be attained, even if for reasons of more convenient design as in the case of the illustrated embodiment, the angle enclosed by these lines differs rather considerably from a right angle. The diameter of the pin, and this is extremely important, is slightly smaller than the width of the slot, but the clearance between the pin and the slot walls should not be larger than necessary to allow for free vibrations of the pin within the slot with small amplitudes. In general, a few thousandths of an inch will be sufficient; in an application such as illustrated in Fig. 1, I have found a clearance of .002″ the required minimum.

Slot 26 is so curved that the ratio of the movement of the pin 27 projected on the radius from the center of the pivot 14 through point P to the movement of the slot is within the above-mentioned values X and Y. In the case of the illustrated embodiment a ratio of approximately 1:6 has been selected, and the slot curve is shaped as an arc of a circle, the center of which is at E on a radius from the center of the pivot 14 at right angles to the radius through P. Thereby turns of lever 16 through equal angles to the right or left will lower or raise the pin 27 approximately equal distances from the neutral position at P. However, it will be noticed that for this purpose the length of the slot from P to R′ is slightly greater than that from P to L.

The second arm 29 of lever 17 is provided with a hole 30 for the attachment of a member, such as rod 9 in Fig. 1, connecting the lever to the controlled part of the craft. Arm 29 is preferably so arranged that it is parallel to arm 22 of lever 16, and its length is so selected that lifting or lowering of the end of arm 22 will cause lifting or lowering of the end of arm 29 approximately the same distances. Thereby it can be attained that a mechanism according to the invention can be inserted into an existing control system without any change of the transmission ratio between the control stick or wheel and the controlled element such as the swash plate device 7, 8. However, it is, of course, also possible to provide a lever arm extending in any other direction and being of any other length than the illustrated arm 29, in order to adapt the mechanism according to the invention to the requirements of a particular case.

The operation of the mechanism will be described with reference to Fig. 3 showing the mechanism of Fig. 2 in diagrammatic form. $a$ is the pivot center of the bell-crank lever 16, the arms of which are denoted by $p$ and $r$; the end of the arm $p$ is at $t$, and the arm $r$ is provided with the curved slot of the mechanism indicated by the arc $L_0R_0$, which is a portion of a circle about point E. The pivot center of the lever 17 is at $b$ and its arms $c$ and $d$ have their ends at the points $e$ and $P_0$ respectively. If now, point $t$ is shifted in the direction of the arrow $u$, lever 16 will be turned counter-clockwise. An end position is reached when the arm $r$ is in the position $r_1$. Thereby the slot is also turned and simultaneously lifted into the position $L_1R_1$. The end of the lever arm $d$, which in the original neutral position was at $P_0$, moves on an arc about $b$ so as to arrive at $R_1$, and arm $c$ is swung upward, i. e. in the same direction as arm $p$ of lever 16. Similarly, if point $t$ of lever 16 is turned down in the direction of the arrow $v$, the slot will be turned into the position $L_2R_2$ thereby lowering the end of lever $d$ to the point $L_2$ and also lowering the point $e$ accordingly. If we consider, on the one hand, the movement of the end of lever arm $d$ in the direction of the radius $r$, i. e. the projection $Q_1Q_2$ of $R_1L_2$ on the radius $r$, and the movement of the slot center between $P_1P_2$, and, on the other hand, in Fig. 4 the movement of the body $O$ between $R'$ and $L''$ when the center of the inclined plane $LR$ is shifted between $M$ and $N$, we find analogy between the relations of $Q_1Q_2$ to $P_1P_2$ and $R'L''$ to $MN$. If it is now assumed that a force acts at $e$ so as to restore the system to neutral, while the slot-provided lever arm is in a position anywhere between $r$ and $r_1$, such force will tend to turn lever 17 in a clockwise direction, with the result that the end of arm $d$ bearing on the cam surface of the slot will tend to lower, i. e. to turn the slot also in a clockwise direction. Owing, however, to the friction between the end of arm $d$ and the cam surface, and to the selected slope ratio, the system is locked in its instantaneous position. Similarly, if the point $e$ has been lowered by a preceding movement of point $t$, a force tending to restore the mechanism to neutral, i. e. to lift and thus, to turn lever 17 in a counter-clockwise direction, will not cause any movement of lever 16 for the same reasons. Vibrations originating with the system connected to the end $e$ of lever 17 will not be transmitted or will be transmitted to an insignificant extent only, to lever 16 on account of the above-mentioned clearance between the pin 27 and the slot walls. If, however, a restoring force prevails in the presence of vibrations, the friction will be overcome, with the result that lever 16 and the parts connected thereto will "creep" back to neutral position.

It has been stated hereinbefore that the ideal location of the pivot $b$ is on a tangent to the arc $P_1P_2$ at the point $P_0$. In the drawings, the location of the pivot differs rather considerably from the ideal. The actual position of point $b$ has been selected in order to show that the effect of a deviation from the ideal is not very material. Whereas in the ideal case the movement of the end of arm $d$ would practically coincide with the line $Q_1Q_2$, arm $d$ according to the drawings moves on line $R_1L_2$ which slightly differs from $Q_1Q_2$ as to length and direction. The influence of this difference can be balanced by correctly selecting the slope slightly different from that which would be suitable for the ideal case. Furthermore, a torque may additionally occur owing to the fact that the direction of a force exercised by the pin 27 on the cam surface does not pass through the center of the pivot $a$. Such torque, depending on its direction, may either increase or decrease the self-locking quality of the mechanism. This influence, however, can also be counteracted if necessary by an increase or decrease of the slope which, as stated hereinbefore, may be selected within the mentioned limits according to the desired sensitivity of the mechanism. Under consideration of all these circumstances a slope of 1:6 has been found satisfactory in a mechanism according to the illustrated embodiment. A slope appreciably smaller than about 1:7 would make the unit irreversible even in the presence of considerable vibrations. A larger slope of about 1:5 would allow a quicker return to neutral under the same loads and vibrations. However, too large a slope would allow too much of the reverse forces to be transmitted through the mechanism, thus destroying its effectiveness and sensitivity. It appears therefore, that the slope, for a mechanism of the illustrated type, should not be larger than about 1:4. In certain instances it may be desirable to provide a high degree of irreversibility near the neutral position and quick-acting return forces at the extreme positions. In that event the slot may be so shaped that the equivalent slope value of the middle portion of the slot is closer to 1:7 and that the value of the end portions is closer to 1:4. Such a slot curve would, of course, differ from the illustrated arc of a circle. Although it is advisable to check in each case, according to circumstances, which slope furnishes best results, the mentioned slope limits of 1:7 and 1:4 can be considered as generally valid, and only in exceptional cases slope values above or below these limits may be adequate.

It will be apparent to those skilled in the art that many alterations and modifications of the mechanism illustrated and described are possible without departing from the spirit and essence of my invention which for this reason shall be limited only by the scope of the appended claims.

I claim:

1. A cam mechanism for a vibration-reducing control unit comprising a first part adapted to be operated by an actuating member and including a cam surface, a second part adapted to be connected to a driven member and constituting a follower normally in engagement with said cam surface, said cam surface being so curved as to be equivalent in effect to a plane inclined in relation to a base normal with respect to a force acting on said plane, the slope of said plane being selected from between an upper and a lower limit, the upper limit being the steepest slope at which self-locking owing to friction can occur with respect to steady forces acting from the side of the driven member to the actuating member, and said lower limit being the smallest slope at which the self-locking quality can be overcome by vibrations of the said follower, and an abutment for engagement by said follower when the latter tends to separate from said cam surface more than a very small distance.

2. A device as claimed in claim 1, wherein the radii of the active arc of the cam curve vary in length so that said arc is equivalent in action to a varying slope within said upper and lower limits.

3. A device as claimed in claim 1, wherein the radii of the median portion of the active arc of the cam curve are longer than the radii of the end portions of said arc so that said end portions are equivalent in action to a steeper slope than said median portion.

4. A device as claimed in claim 1, wherein said upper limit is approximately 1:4 and said lower limit 1:7.

5. A vibration-reducing control unit comprising a pivoted member including a curved cam slot and means to oscillate said member about its pivot through an arc of selected length according to the length of the slot, a follower member engaging in said slot and including means to transmit movement of said follower to an external member, and means to restrict movement of the slot-engaging portion of said follower to a path substantially transverse to the slot curve, said slot being sufficiently wide to permit the engaging follower portion to vibrate therein with small amplitudes, and being so curved that the ratio of the follower motion to the motion of a point of the slot is equivalent to a slope of a plane inclined in relation to a base normal with respect to a force acting on said plane wherein said slope is selected between an upper and a lower limit, the upper limit being the steepest slope at which self-locking owing to friction can occur with respect to steady forces acting from the side of the follower to the pivoted member, and the lower limit being the smallest slope at which the self-locking quality can be overcome by vibrations of said follower.

6. A vibration-reducing control unit comprising a pivoted member including means to oscillate said member about its pivot through an arc of selected length and a cam slot curved according to an arc of a circle eccentric in relation to the pivot of said member, a follower member engaging in said slot and including means to transmit movement of said follower to an external member, and means to restrict movement of the slot-engaging portion of said follower to a path substantially transverse to the slot curve, said slot being sufficiently wide to permit the engaging follower portion to vibrate therein with small amplitudes, the center of said slot curve being so selected in relation to said pivot and said path of said follower that the ratio of the follower motion to the motion of a point of the slot is equivalent to a slope of a plane inclined in relation to a base normal with respect to a force acting on said plane wherein said slope is selected between an upper and a lower limit, the upper limit being the steepest slope at which self-locking owing to friction can occur with respect to steady forces acting from the side of the follower to the pivoted member, and the lower limit being the smallest slope at which the self-locking quality can be overcome by vibrations of said follower.

7. A vibration-reducing control unit comprising two pivoted bell-crank levers, the first one of said bell-crank levers including one arm to oscillate it through an arc of selected length, the other arm of said first lever being provided with a cam slot curved according to an arc of a circle eccentric in relation to the pivot of said first lever, said second lever including one arm to transmit movement of said lever to an external member, the other arm of said second lever constituting a follower in engagement with said slot, the center of said slot arc being located laterally with respect to the connecting line of the pivots of the levers, and the pivot of said second lever in relation to the pivot of said first lever being so located that the engaging portion of said follower is movable in a path transverse to said slot curve, and the diameter of said slot and its eccentricity being so selected that the ratio of the follower motion to the motion of a slot point is between 1:4 and 1:7.

8. A device as claimed in claim 7, the first mentioned arms of said first and said second lever extending toward the same side of the connecting line of the pivots and being substantially parallel when said follower is in the middle position in said slot and being of such lengths that the ends of both said lever arms move substantially on arcs of equal lengths.

HILLIS S. PETERSON.